United States Patent
Hasegawa et al.

(10) Patent No.: US 7,138,188 B2
(45) Date of Patent: Nov. 21, 2006

(54) MAGNETIC IMPLEMENT USING MAGNETIC METAL RIBBON COATED WITH INSULATOR

(75) Inventors: Ryusuke Hasegawa, Morristown, NJ (US); Carl Eugene Kroger, Aynor, SC (US)

(73) Assignee: Metglas, Inc., Conway, SC (US)

( * ) Notice: Subject to any disclaimer, the term of this patent is extended or adjusted under 35 U.S.C. 154(b) by 0 days.

(21) Appl. No.: 11/142,464

(22) Filed: Jun. 2, 2005

(65) Prior Publication Data

US 2005/0221126 A1    Oct. 6, 2005

Related U.S. Application Data

(63) Continuation-in-part of application No. 10/354,791, filed on Jan. 30, 2003.

(51) Int. Cl.
*B32B 15/02* (2006.01)
*B32B 15/04* (2006.01)
*B32B 15/18* (2006.01)

(52) U.S. Cl. ............ 428/611; 428/630; 428/632; 428/336; 428/450; 336/234

(58) Field of Classification Search ............ 428/611, 428/624, 630, 632, 457, 458, 692, 900, 928, 428/641, 681, 678, 446, 450, 426, 433, 469, 428/336; 336/218, 234; 361/268
See application file for complete search history.

(56) References Cited

U.S. PATENT DOCUMENTS

| | | | |
|---|---|---|---|
| 4,808,464 A | 2/1989 | Pavlik et al. | 428/216 |
| RE32,925 E * | 5/1989 | Chen et al. | 148/403 |
| 4,845,454 A | 7/1989 | Watanabe et al. | 336/212 |
| 4,983,859 A | 1/1991 | Nakajima et al. | 307/419 |
| 5,242,760 A | 9/1993 | Matsuoka et al. | 428/692 |
| 5,443,664 A | 8/1995 | Nakajima et al. | 148/307 |
| 5,470,646 A | 11/1995 | Okamura et al. | 428/216 |
| 5,541,566 A | 7/1996 | Deeney | 336/177 |
| 5,573,863 A | 11/1996 | Hayakawa et al. | 428/694 T |
| 5,639,566 A | 6/1997 | Kamura et al. | 428/692 |
| 5,780,177 A | 7/1998 | Tomita et al. | 428/692 |
| 6,011,475 A | 1/2000 | Herzer | 340/572.6 |
| 6,404,317 B1 | 6/2002 | Mizoguchi et al. | 336/200 |
| 2003/0150528 A1 | 8/2003 | Martis et al. | 148/304 |
| 2003/0226618 A1 | 12/2003 | Herzer et al. | 148/121 |

FOREIGN PATENT DOCUMENTS

| JP | 1-289228 | 11/1989 |
|---|---|---|
| JP | 3-208406 | 9/1991 |
| JP | 10-199720 | * 7/1998 |

OTHER PUBLICATIONS

Elias, Hans-Georg, An Introduction to Plastics, pp. 186, 187, 259, 263-265 (no month, 1993).*
Toshinori Oda et al., Patent Abstracts of Japan, "Noise Filter", Publication No. 01289228 A, Publication Date: Nov. 21, 1989.
Takao Kusaka et al., Patent Abstracts of Japan, "Noise Filter Element", Publication No. 03208406.A, Publication Date: Sep. 11, 1991.
U.S. Appl. No. 10/354,791, filed Jan. 30, 2003, Ryusuke Hasegawa et al.

* cited by examiner

*Primary Examiner*—Michael E. Lavilla

(57) ABSTRACT

A magnetic ribbon or sheet is coated with an electrical insulator prior to formation of a magnetic implement. Manufacture of the magnetic implement is accomplished in a single process without a need for co-winding magnetic and insulator ribbons. Thermal property differences between the magnetic material and the insulator operate during heat treatment to enhance magnetic property modification of the implement.

19 Claims, 7 Drawing Sheets

MAGNETIC IMPLEMENT USING MAGNETIC METAL RIBBON COATED WITH INSULATOR

CROSS-REFERENCE TO RELATED APPLICATIONS

This application is a continuation-in-part of U.S. patent application Ser. No. 10/354,791, filed Jan. 30, 2003, the contents of which are incorporated herein by reference.

BACKGROUND OF THE INVENTION

1. Field of the Invention

This invention relates to magnetic implements for cores of transformers and inductors; and more particularly, to a magnetic implement composed of metal alloy ribbon coated with an electrical insulating material and adapted for use in transformer and inductor cores that operate at high frequencies.

2. Description of the Related Art

Magnetic cores are widely used for electric power transformers that carry electrical current at low frequencies, typically less than 500 Hz. When a transformer is operated at a given frequency, it loses energy, owing in part to its magnetic loss. There are two sources for the magnetic loss: hysteresis loss, which is proportional to the frequency, and eddy-current loss, which is proportional to the n-th power of the frequency where n ranges from about 1.3 to 2. Generally, the proportionality coefficient for the eddy-current loss is proportional to the square of the core material thickness. Thus, electrically insulated, thinner magnetic materials result in lower eddy-current losses. A similar situation exists for inductors operated under an AC excitation. When the operating frequency for these transformers and inductors is low, as is the case for electric power transformers normally operated at 50 or 60 Hz, the magnetic loss due to eddy-current is relatively low compared with hysteresis loss, and some thin oxide coating on the surface of the magnetic material is sufficient to insulate the material. Magnesium oxide is widely used for the coating. However, the degree of adhesion of this oxide to the surface of a magnetic material is poor because it is in a powder form, and the powder often falls off the surface during core production.

Magnetic materials often used as core materials come in ribbon or sheet forms, which are convenient to form tape-wound or stacked cores. Recent advances made in forming magnetic ribbons and sheets include amorphous materials. These materials are conveniently produced using the teachings of U.S. Reissue Pat. No. RE 32925.

When a magnetic core is used at high frequencies, a better or more secure surface coating becomes necessary to ascertain effective electrical insulation between magnetic materials.

A thin, non-conductive insulator, such as paper, polymer film and the like, has been commonly used for such purposes. To maximize the insulation, sufficient dielectric properties are needed for the insulator materials. Low dielectric constants and high dielectric breakdown voltages are generally preferred. These features become increasingly important when the magnetic components are operated at high frequencies and high voltages. Although the magnetic metal-insulator-magnetic metal configuration just described is widely used, the process for manufacturing that configuration has many problems. Such a manufacturing process requires a special apparatus, in which a magnetic metal and an insulator in ribbon or sheet form are co-wound to produce a magnetic component having the form of a wound core. The magnetic metal-insulator-magnetic metal configuration can also be produced by an apparatus wherein a magnetic metal and an insulator are alternately juxtaposed to form a stacked core. Co-winding processes of the alternately juxtaposed type described often result in punctured or torn insulators because of the sharpness of the magnetic metal ribbon or sheet.

There is a need for a method and a means for producing magnetic implements suited for use in transformer and inductor cores that operate at high frequencies. Especially needed is a process for manufacture of magnetic implements comprising amorphous metal ribbon or sheet, which avoids puncturing and tearing of insulators during co-winding operations. A thermally insulated magnetic implement having improved combinations of magnetic properties induced by heat treatment is also needed.

SUMMARY OF THE INVENTION

The present invention provides a thermally insulated magnetic implement having an improved combination of magnetic properties. A ferromagnetic ribbon or sheet is coated with an electrical insulating material prior to formation of a magnetic implement. Manufacture of the magnetic implement is accomplished in a single process without the need for co-winding magnetic and insulator ribbons. During heat treatment, thermal property differences between the magnetic material and the insulator operate to enhance magnetic property modification of the implement.

In one aspect, the present invention provides a method for fabrication of a magnetic implement that reliably juxtaposes electrical insulation between metallic magnetic materials and simultaneously tailors magnetic properties of the implement to achieve a desired magnetic performance. An electrical insulation material, such as $SiO_2$, applied to the surfaces of the magnetic material during fabrication of the magnetic implement is available in liquid form. It is coated on the magnetic material by brushing the liquid insulator thereon or passing the magnetic material through a liquid insulator bath. After the insulation material dries, the coated magnetic material is fabricated into a magnetic implement by winding or stacking the material. The fabricated implement is then heat-treated to modify or improve its magnetic properties. When produced, the magnetic implement comprises a magnetic core that includes a magnetic ribbon or a sheet coated with an electrical insulator having desirable dielectric properties and thicknesses.

In another aspect of the invention, during fabrication, a metallic magnetic material in ribbon or sheet form is selected in light of the performance specification required for the implement. The required electrical insulation properties for the electrical insulation material, such as dielectric properties and breakdown voltages are then determined. As a candidate insulation material, $SiO_2$ is selected and applied on the magnetic material surfaces. Selection of the magnetic metal and the candidate insulation material is governed by certain criteria, including the difference between the thermal expansion coefficients of the metal and insulating materials. This thermal expansion coefficient difference significantly affects magnetic performances of the heat-treated implements. The magnetic implements thus fabricated are especially well suited for use in pulse transformers, signal or current metering transformers, electrical chokes and high frequency electrical transformers.

BRIEF DESCRIPTION OF THE DRAWINGS

The invention will be more fully understood and further advantages will become apparent with reference to the following detailed description and the accompanying drawings, in which.

DETAILED DESCRIPTION OF THE PREFERRED EMBODIMENTS

Figure 1:
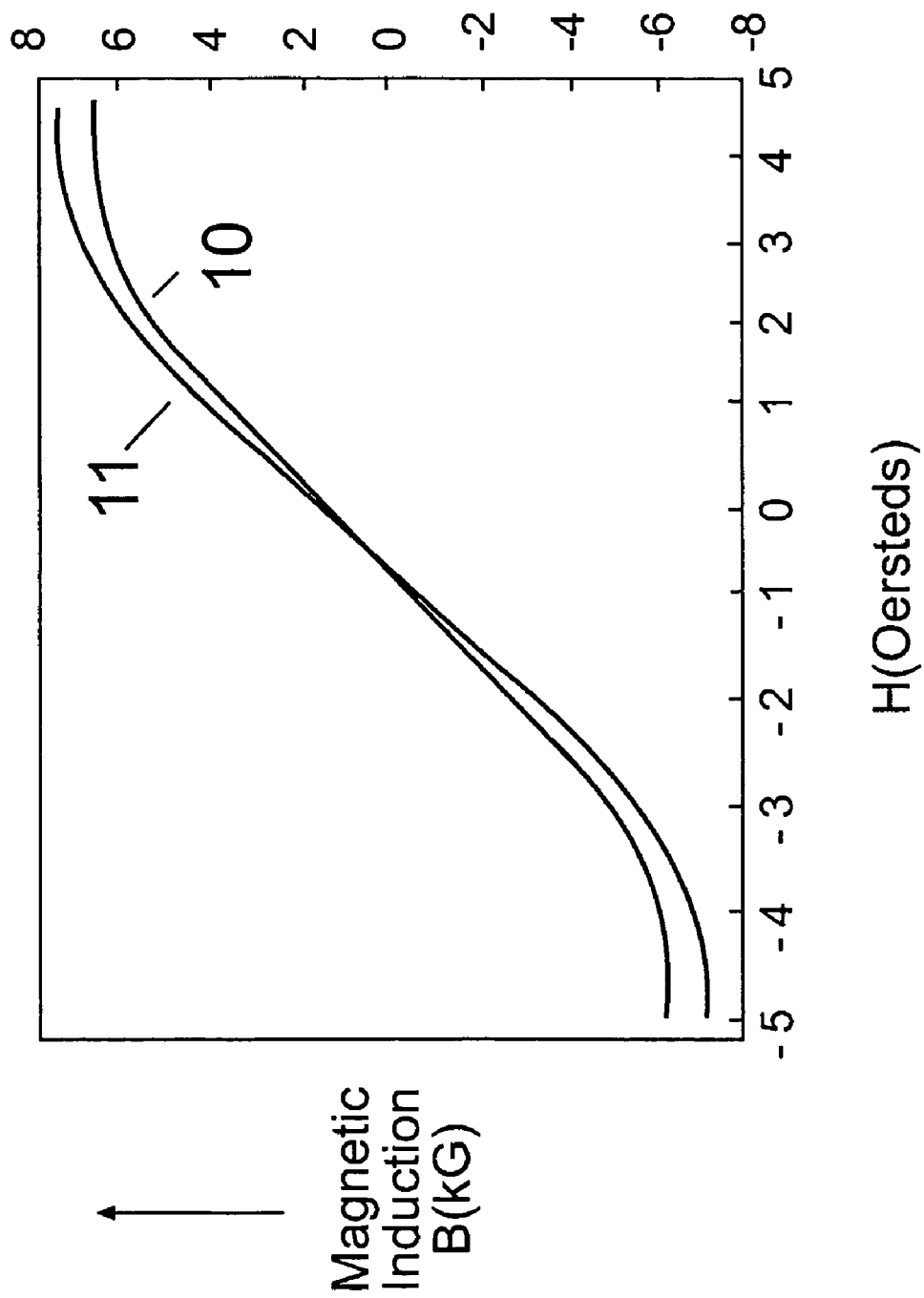
FIG. 1 is a graph comparing the magnetization behavior of a core constructed in accordance with an embodiment of the present invention, shown by Curve 10, and the magnetization behavior of a conventional core, shown by Curve 11, wherein the magnetic flux B is shown as a function of the applied DC field H for the two cores comprising cobalt-based METGLAS® 2705M ribbon, the cores have the approximate dimensions OD×ID×HT=97×46×25 mm, and have been heat-treated at approximately 300° C. for about 1 hour with a DC field of about 5 kOe applied along the cores' axis direction.
Figure 2:
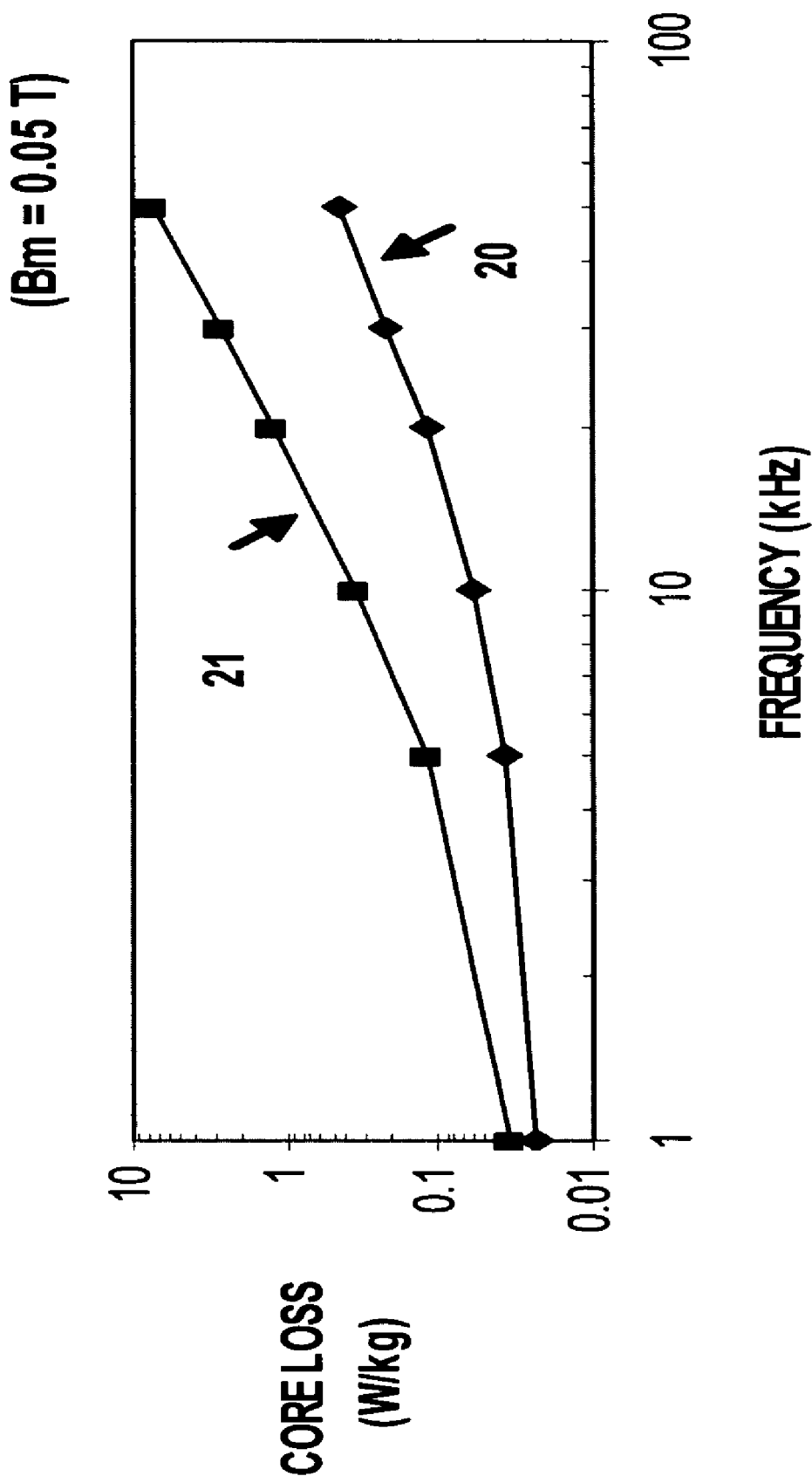
FIG. 2 is a graph depicting core loss measured at 0.05 T induction as a function of frequency for a core of an embodiment of the present invention, shown by Curve 20, and for a conventional core, shown by Curve 21, the cores being the same as in FIG. 1.
Figure 3:
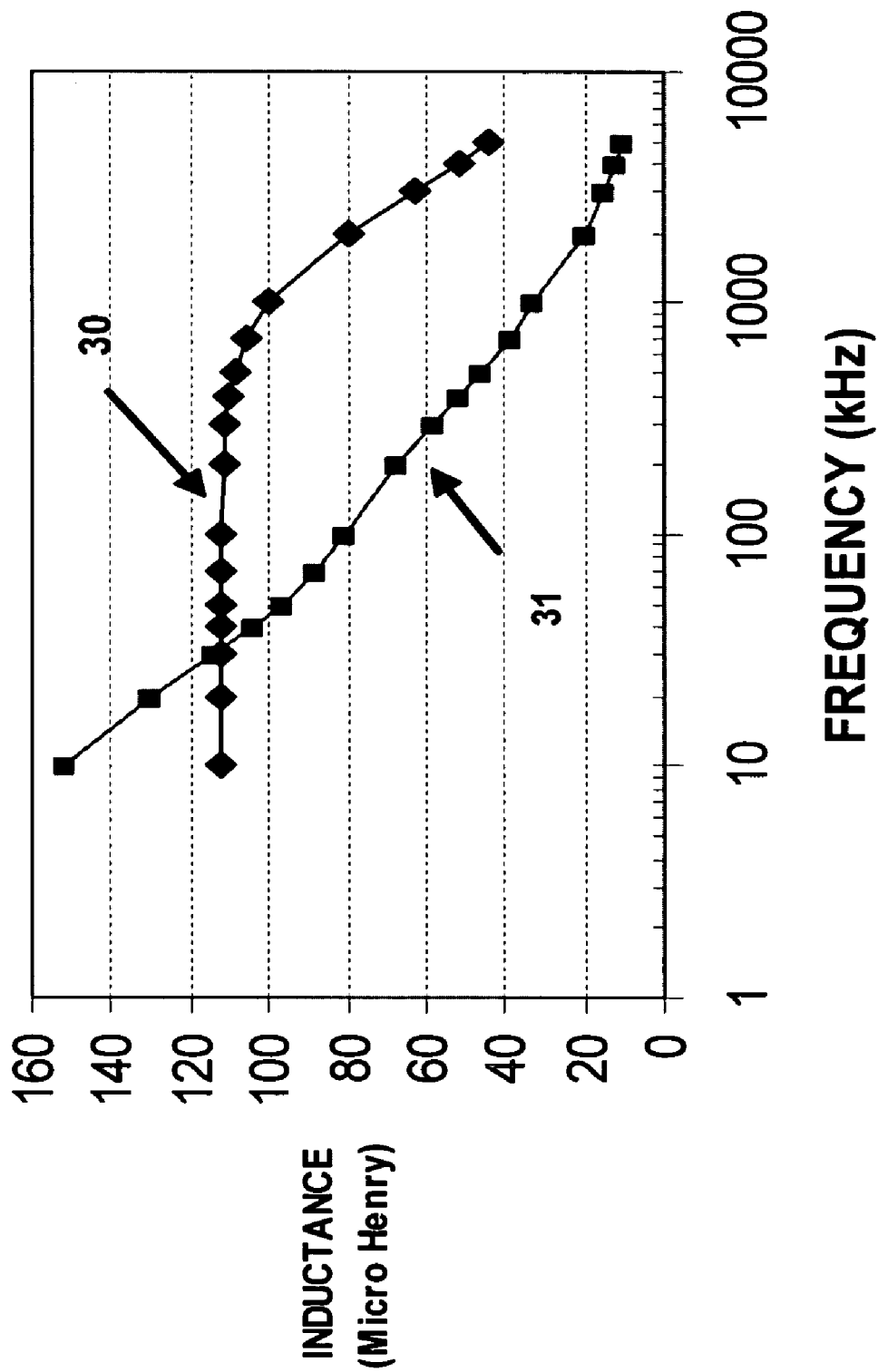
FIG. 3 is a graph comparing an inductance of an inductor made from the same core of the embodiment of the present invention of FIGS. 1 and 2 as a function of frequency, shown by Curve 30, and an inductance for the conventional core of FIGS. 1 and 2, shown by Curve 31; both of the inductors having five copper windings.
Figure 4:
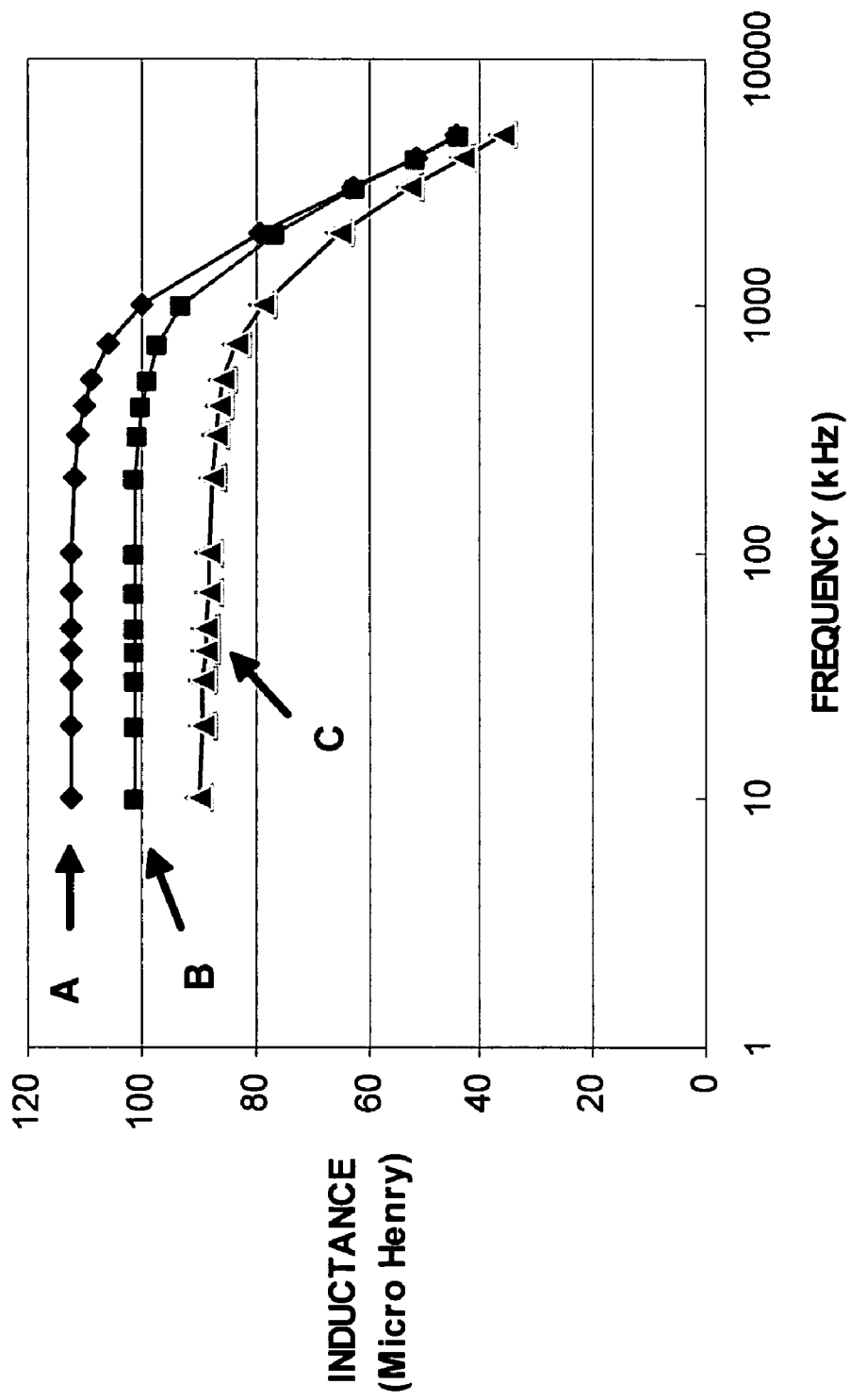
FIG. 4 is a graph showing inductance as a function of frequency for inductors made from METGLAS®2705M alloy-based cores for embodiments of the present invention, having the approximate dimensions OD×ID×HT=97×46×25 mm, and having been heat-treated in a DC field of about 5 kOe applied along cores' axis direction at approximately 300° C. for about 1 hour (Curve A), at approximately 270° C. for about 1 hour (Curve B) and at approximately 250° C. for about 3 hours (Curve C), all of the inductors having five copper windings.

A commercially available amorphous metal ribbon METGLAS® 2705M was coated with $SiO_2$. The coating thickness ranged from about 1 to about 4 µm. The dielectric constant of the coated insulator is approximately 3.8. The coated amorphous metal ribbon having a width of about 25 mm was wound to form toroidally shaped cores containing the dimensions OD=97 mm, ID=46 mm and HT=25 mm. Upon being wound, the cores were heat-treated at temperatures ranging from about 250° C. to 330° C. for 1-5 hours. This heat-treatment temperature range was selected because the alloy's Curie temperature is about 350° C. During the heat-treatment, a DC field of about 5 kOe (400 kA/m) was applied along the core's axis direction to achieve a linear BH behavior. The result obtained on a core of an embodiment of the present invention heat-treated at 300° C. for 1 hour is shown by Curve 10 in FIG. 1. This figure reveals a constant DC permeability µdc of about 2,100 up to an applied magnetic field of about 2.5 Oe (200 A/m) and a coercivity Hc of about 16 mOe (1.3 A/m). FIG. 1 also shows a BH behavior, shown by Curve 11, taken on a prior art core made from ribbon with no $SiO_2$ coating, which was annealed under the same annealing condition as the core of the embodiment of the present invention. The data, given by Curve 11, for the conventional core of FIG. 1 yield µdc=2300 and Hc=16 mOe (1.3 A/m). Although there is about a 10% difference in the DC permeability between the core of the embodiment of the present invention and the DC permeability of a conventional core, basically BH behaviors of the two cores are about the same, which is expected because the measurements were performed with DC excitations. However, a significant difference in the high frequency properties between the cores of embodiments of the present invention, shown by Curve 20, and the conventional cores, shown by Curve 21, was observed as shown in FIG. 2, in which AC core loss as a function of frequency is compared for the two cores. More than an order of magnitude reduction of core loss is achieved above 10 kHz in the core of an embodiment of the present invention, as shown by Curve 20, compared with a same size conventional core, as shown by Curve 21. The difference becomes increasingly large as the exciting frequency increases. This trend is more clearly demonstrated in FIG. 3, in which an inductance of an inductor made from the same core of FIGS. 1 and 2 of the embodiments of the present invention, shown by Curve 30, is compared with an inductance of an inductor made from a conventional core of FIGS. 1 and 2, shown by Curve 31. While a rapid decrease of inductance is seen for an inductor made from a conventional core above 10 kHz, an inductor of an embodiment of the present invention shows a substantially constant inductance of 112 µH, corresponding to an AC permeability of 2,350, up to a frequency of about 500 kHz. The feature shown by Curve 30 in FIG. 3 indicates that the core of an embodiment of the present invention can be used in a pulse transformer, signal transformer, electrical choke and electrical energy storage inductor operated at frequencies up to 1 MHz region without loss of performance. In an effort to further increase the useful frequency range of a core for embodiments of the present invention, an annealing temperature was changed with the same annealing field of 5 kOe applied along cores' axis direction and the results are shown in FIG. 4, wherein inductance of the cores annealed with different temperatures is shown as a function frequency. It was found that the inductance, and hence, the core's permeability, decreases less rapidly for core C annealed at approximately 250° C. for about 3 hours than for core A annealed at approximately 300° C. for about 1 hour, thus extending the upper frequency limit beyond 1 MHz by using core C.

Figure 5:
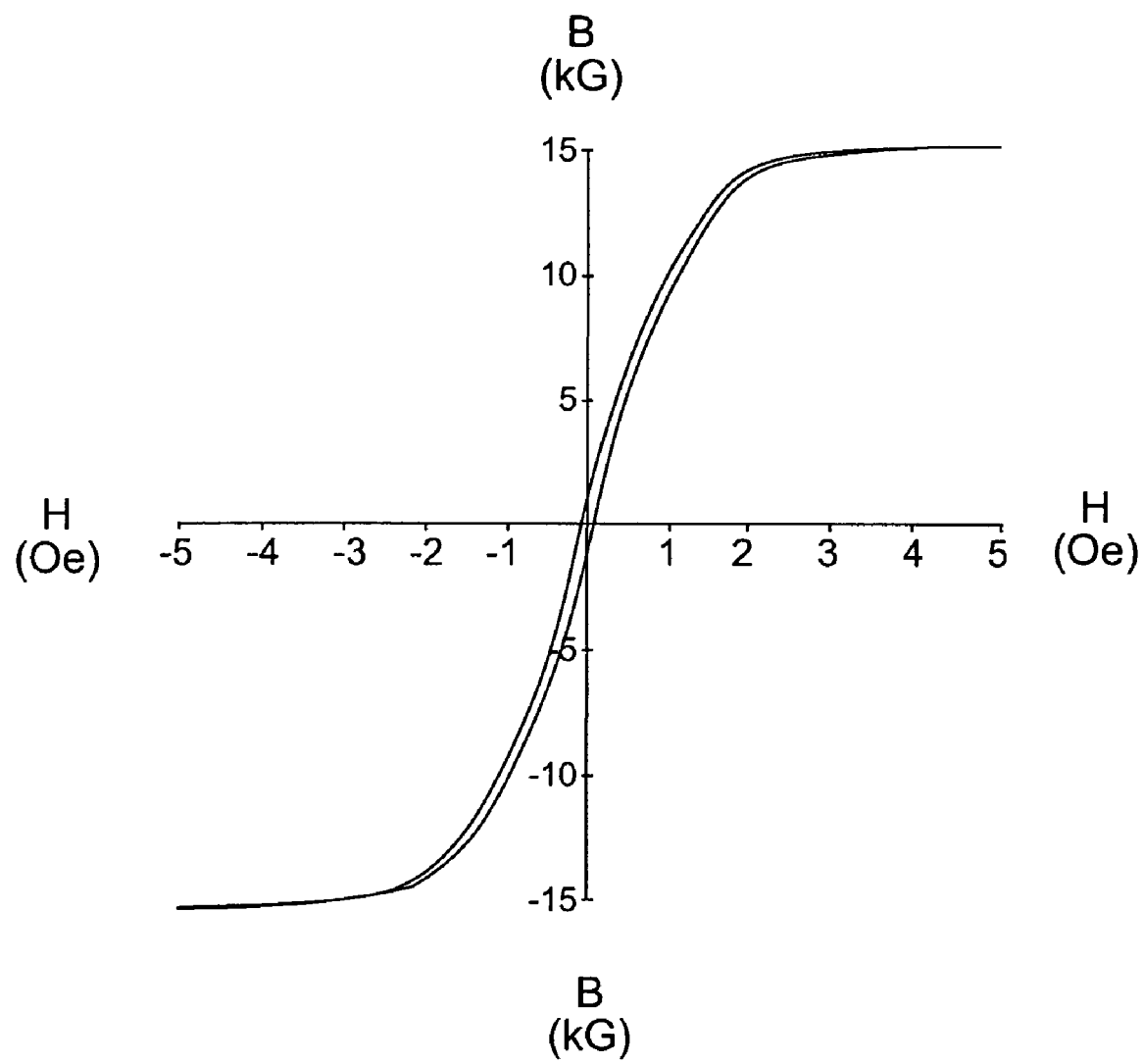
FIG. 5 is a graph showing a BH behavior under DC excitation of a core of an embodiment of the present invention using an iron-based METGLAS®2605SA1 alloy ribbon with $SiO_2$ coating, having the approximate dimensions of OD×ID×HT=31×22×25 mm, and having been heat-treated in a DC field of about 5 kOe applied along cores' axis direction at approximately 380° C. for about 3 hours.

A positively magnetostrictive commercially available METGLAS® 2605SA1 amorphous alloy ribbon was fabricated with a $SiO_2$ coating. The thickness of the $SiO_2$ coating was between 1 and 4 µm and the $SiO_2$-coated amorphous alloy ribbon was wound into magnetic cores. The cores had the approximate physical dimensions of OD×ID×HT=31× 22×25 mm. Each of the cores was heat-treated at about 375–390° C. for 1–3 hours with a DC field of 5 kOe (400 kA/m) applied along the cores' axis direction. BH magnetization behaviors of these cores were taken at room temperature and one such example is shown in FIG. 5. Cores having substantially the same dimensions were prepared from the substantially the same ribbon without $SiO_2$ coating and heat-treated under substantially the same conditions as the core of FIG. 5. An example of the BH magnetization behavior of this prior art core, taken at a DC excitation, is set forth in FIG. 6. A comparison of the data contained by FIGS. 5 and 6 indicates that the magnetic anisotropy of the ribbon has been modified considerably by the $SiO_2$ coating during the heat-treatment in such a way that the $SiO_2$ coating helped to enhance the BH linearity. The modified magnetic anisotropy introduced an induced anisotropy along the axis direction of the cores. In turn, the large induced magnetic anisotropy along the core's axis direction resulted in a linear permeability of the core material with the applied field. The enhanced linearity obtained in the core for embodiments of the present invention can be utilized in pulse transformers and electrical chokes and the like in which operational magnetic fields are extended beyond those of the cores of prior art because the increased BH linearity region. Furthermore, the $SiO_2$ coating on the ribbon maintains the high magnetic permeability level in high frequency regions. This is demonstrated in FIG. 7, in which inductance of an inductor using a core of an embodiment of the present invention with five copper windings is compared with an inductance of an inductor using a conventional core. Data contained by FIG. 7 indicates that an inductor core of an embodiment of an embodiment of the present invention is useful as an electrical choke, a pulse transformer and the like at high frequencies below 1 MHz. Furthermore, due to the larger inductance value, as shown by Curve 70 in FIG. 7, achievable in the core of an embodiment of an embodiment of the present invention compared with an equivalent conventional core, shown by Curve 71 of FIG. 7, copper windings on a core of the present invention can be reduced by about 50%. Thus overall inductor size can be reduced considerably by using a core in accordance with such embodiments of the present invention.

The following examples are presented to provide a more complete understanding of the invention. The specific techniques, conditions, materials, proportions and reported data set forth to illustrate the principles and practice of the invention are exemplary for embodiments thereof and should not be construed as limiting the scope of the invention.

EXAMPLES

Sample Preparation

Commercially available amorphous materials designated METGLAS® 2705M and 2605SA1 ribbon having widths of about 25 mm were coated with $SiO_2$. The thickness of the amorphous ribbons ranged from approximately 16–25 μm, while the $SiO_2$ layers were approximately 1–4 μm thick. Each of the ribbons was wound to form a toroidally shaped magnetic core having the approximate dimensions OD=30–100 mm, ID=20–50 mm and HT=25 mm. The wound cores were heat-treated at about 250–330° C. for approximately 1–5 hours with a DC magnetic field of about 5 kOe (400 kA/m) applied along the toroid's axis direction. Cores using uncoated ribbon were prepared in the same manner.

Magnetic Measurements

Figure 6:
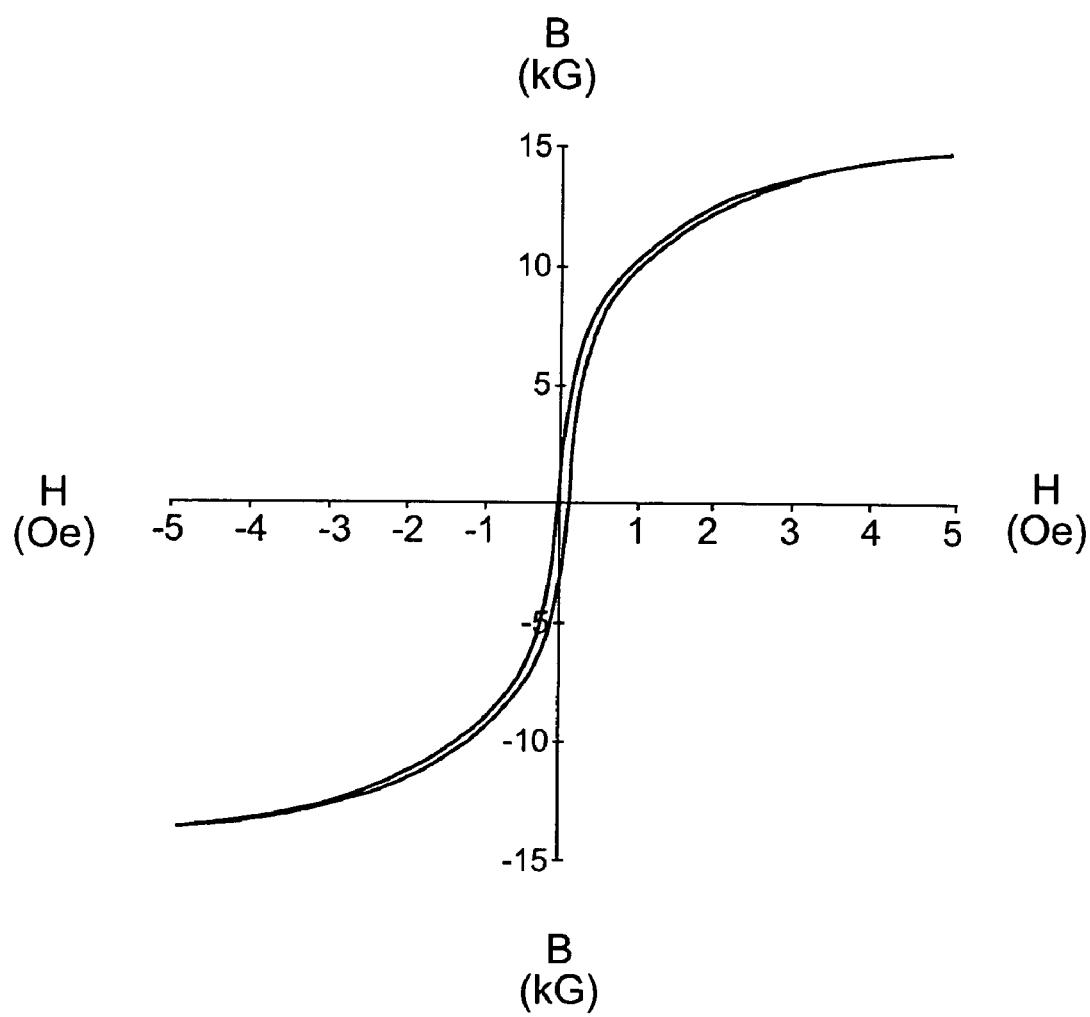
FIG. 6 is a graph showing a BH behavior under DC excitation of a conventional core using an iron-based METGLAS®2605SA1 alloy ribbon without $SiO_2$ coating, having the approximate dimensions of OD×ID×HT=31×22×25 mm, and having been heat-treated under the same conditions as the core of the embodiment of the present invention of FIG. 5.
Figure 7:
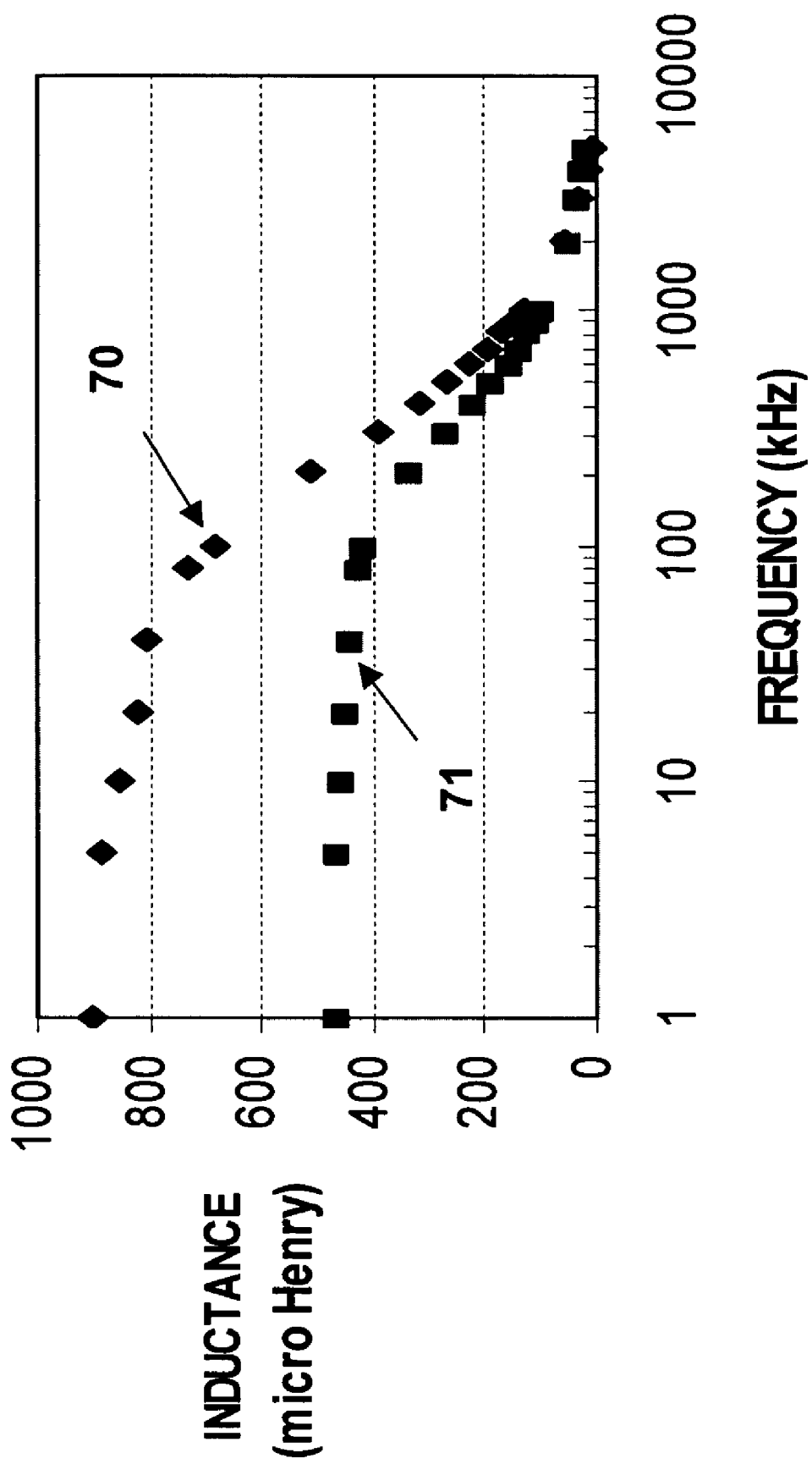
FIG. 7 is a graph showing inductance as a function of frequency for a core of the embodiment of the present invention from FIG. 5, shown by Curve 70, and an inductance for a conventional core from FIG. 6, shown by Curve 71.

For DC hysteresis measurements, each core had 20 copper winding turns in the primary and secondary coils. A commercially available BH hysteresigraph was used to generate DC hysteresis loops on the cores. FIGS. 1, 5 and 6 are representative of the BH loops taken.

At high frequencies, to avoid inter-winding capacitance the number of the primary and secondary copper winding turns was reduced to five or ten. A measurement frequency of approximately 1 kHz–10 MHz was chosen, since it was in the operating frequency range of practical devices. A commercially available inductance bridge was used for this purpose. Data thus generated are set forth in FIGS. 3, 4 and 7. For the core loss measurement of FIG. 2, a standard technique following the guidelines of IEEE Standards 393–1991 was used.

Having thus described embodiments of the invention in rather full detail, it will be understood that such detail need not be strictly adhered to but that further changes and modifications may suggest themselves to one skilled in the art, all falling within the scope of the invention as defined by the following claims.

What is claimed is:

1. A magnetic implement, comprising:
a magnetic ribbon coated with an electrical insulator comprising $SiO_2$ and having a thickness ranging from about 1 μm to about 4 μm, magnetomechanical properties of the magnetic ribbon and thermal properties of the insulator being operable during heat treatment to reduce core loss of said implement.

2. The magnetic implement as recited by claim 1, wherein the ribbon comprises an amorphous metal magnetic alloy.

3. The magnetic implement as recited by claim 2, wherein the ribbon of the amorphous metal magnetic alloy is based on a zero or near-zero magnetostrictive amorphous alloy.

4. The magnetic implement as recited by claim 2, wherein the ribbon of amorphous metal magnetic alloy comprises an amorphous metal magnetic alloy with a positive magnetostriction.

5. The magnetic implement as recited by claim 1, wherein the electrical insulator has a dielectric constant below 10, wherein the electrical insulator is stable up to a temperature of above approximately 100° C.

6. The magnetic implement as recited by claim 1, wherein the heat treatment of the magnetic implement reduces core loss of said implement to a level below a core loss of said implement with no heat treatment.

7. The magnetic implement as recited by claim 6, wherein the implement has a magnetic excitation direction and the heat-treatment is carried out with an applied field along a direction perpendicular to the magnetic excitation direction.

8. The magnetic implement as recited by claim 6, wherein the heat-treatment is carried out with an applied field of a plurality of kilo Gauss applied along a direction perpendicular to a magnetic excitation direction.

9. The magnetic implement as recited by claim 1, wherein the implement is a high frequency inductor.

10. The magnetic implement as recited by claim 9, wherein the magnetic inductor is an electrical choke.

11. The magnetic implement as recited by claim 9, wherein the magnetic inductor is an electrical energy storage media.

12. The magnetic implement as recited by claim 1, wherein the implement is a high frequency transformer.

13. The magnetic implement as recited by claim 12, wherein the transformer is a pulse transformer.

14. The magnetic implement as recited by claim 12, wherein the transformer is a signal transformer.

15. The magnetic implement as recited by claim 12, wherein the transformer is a current metering transformer.

16. A magnetic implement, comprising:
   a magnetic sheet coated with a $SiO_2$ electrical insulator having a thickness ranging from about 1 μm to about 4 μm and heat-treated, wherein magnetomechanical properties of the magnetic sheet and thermal properties of the insulator are operable during heat treatment to reduce core loss of the implement.

17. A magnetic implement heat-treated to reduce core loss of the magnetic implement to a level below a core loss of an unheat-treated magnetic implement, comprising:

a heat-treated magnetic implement fabricated from a $SiO_2$ electric insulator-coated magnetic ribbon, wherein the electrical insulator has a thickness ranging from about 1 μm to about 4 μm.

18. The magnetic implement as recited by claim 17, wherein the ribbon comprises an amorphous metal magnetic alloy with a positive magnetostriction.

19. The magnetic implement as recited by claim 17, wherein the electrical insulator has a dielectric constant below 10, and wherein the electrical insulator is stable up to a temperature of above approximately 100° C.

* * * * *